United States Patent
Sharma

(10) Patent No.: US 9,195,514 B2
(45) Date of Patent: Nov. 24, 2015

(54) SYSTEM AND METHOD FOR MANAGING P-STATES AND C-STATES OF A SYSTEM

(75) Inventor: Ranjan Sharma, New Albany, OH (US)

(73) Assignee: Alcatel Lucent, Boulogne-Billancourt (FR)

(*) Notice: Subject to any disclaimer, the term of this patent is extended or adjusted under 35 U.S.C. 154(b) by 546 days.

(21) Appl. No.: 13/561,571

(22) Filed: Jul. 30, 2012

(65) Prior Publication Data

US 2014/0033207 A1  Jan. 30, 2014

(51) Int. Cl.
| | |
|---|---|
| G06F 1/26 | (2006.01) |
| G06F 1/32 | (2006.01) |
| G06F 9/50 | (2006.01) |
| G06F 11/34 | (2006.01) |
| G06F 11/30 | (2006.01) |

(52) U.S. Cl.
CPC ............ *G06F 9/5094* (2013.01); *G06F 1/3203* (2013.01); *G06F 1/324* (2013.01); *G06F 1/3296* (2013.01); *G06F 11/30* (2013.01); *G06F 11/3072* (2013.01); *G06F 11/3409* (2013.01); *G06F 11/3495* (2013.01); *G06F 11/3433* (2013.01); *G06F 2201/81* (2013.01); *G06F 2209/5019* (2013.01); *Y02B 60/1217* (2013.01); *Y02B 60/1285* (2013.01); *Y02B 60/142* (2013.01)

(58) Field of Classification Search
CPC ... G06F 1/3203; G06F 9/505; G06F 11/3409; G06F 11/3433; G06F 11/3495; G06F 2201/81
USPC .................. 713/300, 320, 322, 323, 324, 330
See application file for complete search history.

(56) References Cited

U.S. PATENT DOCUMENTS

| | | | |
|---|---|---|---|
| 7,170,982 B2 | 1/2007 | Li et al. | |
| 7,856,549 B2 * | 12/2010 | Wheeler | 713/1 |
| 8,145,514 B2 | 3/2012 | Cai | |
| 2010/0162023 A1 * | 6/2010 | Rotem et al. | 713/340 |
| 2011/0221396 A1 * | 9/2011 | Glauning | 320/136 |

OTHER PUBLICATIONS

"Advanced Configuration and Power Interface Specification"; http://www.acpi.info/spec.htm; Revision 5.0; Dec. 6, 2011; pp. 1-958; Hewlett-Packard Corp., Intel Corp., Microsoft Corp., Phoenix Technologies, Ltd., Toshiba Corp.

* cited by examiner

*Primary Examiner* — Michael J Brown
(74) *Attorney, Agent, or Firm* — Chiesa Shahinian & Giantomasi PC

(57) ABSTRACT

A current value of a load indicator of a system is determined, by an application entity, based on one or more of a central processor unit utilization measure of the system, a memory utilization measure of the system, a system-internal resources utilization measure, an input/output utilization measure of the system, and a secondary storage utilization measure of the system, wherein the system is associated with a plurality of P-states and a plurality of C-states. An operating mode of the system is determined, by the application entity, based on the current value of the load indicator, wherein the operating mode comprises a P-state selected from the plurality of P-states and a C-state selected from the plurality of C-states. The system is operated in accordance with the operating mode. A predictive load map associating respective time periods and respective operating modes may be generated and adaptively adjusted.

20 Claims, 8 Drawing Sheets

| TIME PERIOD DURING A DAY | OPERATING MODE |
|---|---|
| BEFORE t0 | HIGH |
| t0-t1 | MEDIUM HIGH |
| t1-t2 | MEDIUM |
| t2-t3 | LOW |
| t3-t4 | MEDIUM |
| t4-t5 | MEDIUM HIGH |
| AFTER t5 | HIGH |

| TIME PERIOD DURING A DAY | OPERATING MODE |
|---|---|
| BEFORE t0 | HIGH |
| t0-t1 | MEDIUM HIGH |
| t1-t2 | HIGH |
| t2-t3 | LOW |
| t3-t4 | MEDIUM |
| t4-t5 | MEDIUM HIGH |
| AFTER t5 | HIGH |

733 spans rows t0-t1 and t1-t2.

*FIG. 7*

SYSTEM AND METHOD FOR MANAGING P-STATES AND C-STATES OF A SYSTEM

TECHNICAL FIELD

This specification relates generally to systems and methods for operating a data processing system, and more particularly to systems and methods for managing the P-states and C-states of a server computer in a network environment.

BACKGROUND

Charging Collection Function (CCF) is a transactional entity that implements offline charging in a telecommunications network. Offline charging is accomplished via network elements with integrated Charging Trigger Function (CTF), reporting session and network usage to the CCF via Diameter Accounting Requests (ACRs), which are acknowledged by the CCF with a Diameter Accounting Answer (ACA) for each ACR.

For simple voice calls, the count of ACRs for a session is typically 3 to 10, depending on the number of CTFs reporting the session. However, with Long-Term Evolution (LTE) and support of flow-based bearer charging, the ACR count may increase to 30 or more per session. The session duration itself may increase to ten minutes or longer, making it necessary for the CCF to hold session information in RAM for a longer duration.

An increase in accounting traffic puts a huge processing load on the CCF servers in a telecommunications network, particularly when Tier-1 service providers with sizeable subscriber populations are served. Higher traffic increases the need for processing resources. In addition, as the duration of sessions increases, CCFs must retain necessary information in memory for a longer period. Thus, the need for resources—both the need for central processing unit (CPU) cycles and the need for available RAM—may be elevated for a significant period of time each day.

To handle increased traffic, and the increased central processing unit (CPU)-intensive transactional processing, more powerful server architecture has been developed, such as multi-core processors and blade-based architectures. Existing systems use dual-core, quad-core, hex-core, and octa-core CPUs, for example. Some blade servers can host one or more multi-core CPUs, for example. Such equipment enables vendors to provide high package density in a small form factor, and increased computing power to handle the increased traffic.

SUMMARY

In accordance with an embodiment, a method of operating a data processing system is provided. A current value of a load indicator of a system is determined based on one or more of a central processor unit utilization measure of the system, a memory utilization measure of the system, a system-internal resources utilization measure, an input/output utilization measure of the system, and a secondary storage utilization measure of the system, wherein the system is associated with a plurality of P-states and a plurality of C-states. An operating mode of the system is determined based on the current value of the load indicator, wherein the operating mode comprises a P-state selected from the plurality of P-states and a C-state selected from the plurality of C-states. The system is operated in accordance with the operating mode. In one embodiment, the system comprises a charging collection function server.

In one embodiment, the value of the load indicator is determined, the operating mode is determined, and the system is operated, by an application entity running on the system, or running at a remote location. The application entity is not part of the underlying operating system, or of the middleware, of the system.

In another embodiment, a first mapping that associates each of a plurality of values of the load indicator with a respective desired operating mode is generated. A desired operating mode associated with a current value of the load indicator is identified, based on the first mapping.

In another embodiment, the first mapping is generated by associating a first value of the load indicator to a first operating mode comprising a first P-state, and associating a second value of the load indicator to a second operating mode comprising a second P-state, the second P-state being different from the first P-state. In one embodiment, the first operating mode further comprises a selected C-state, and the second operating mode further comprises the selected C-state. In another embodiment, the first operating mode further comprises a first C-state, and the second operating mode further comprises a second C-state different from the first C-state.

In another embodiment, a first range of values of the load indicator and a second range of values of the load indicator are defined, the first range of values comprising the first value, the second range of values comprising the second value. The first operating mode is associated with the first range of values, and the second operating mode is associated with the second range of values.

In another embodiment, a second mapping that associates the first range of values of the load indicator with a first period of time, and associates the second range of values of the load indicator with a second period of time, is generated. An expected load value is determined based on the second mapping. A selected operating mode associated with the expected load value is identified, based on the first mapping, and the system is operated in accordance with the selected operating mode.

In another embodiment, a determination is made that the current value of the load indicator is different from the expected load value. A second operating mode associated with the current value of the load indicator is selected, and the system is operated in accordance with the second operating mode.

In another embodiment, a system is operated in accordance with a predictive load map, and the predictive load map is adaptively adjusted based on a current value of a load indicator of a system. A system is operated based on a mapping showing relationships between a plurality of time periods and a plurality of operating modes of a system, wherein the system is associated with a plurality of P-states and a plurality of C-states, wherein each operating mode comprises a respective P-state selected from the plurality of P-states and a respective C-state selected from the plurality of C-states. During a selected time period during which the system is operated in accordance with a first operating mode in accordance with the mapping, a current value of a load indicator of the system is determined based on one or more performance measures. A second operating mode is identified from among the plurality of operating modes, based on the current value of the load indicator, the second operating mode being different from the first operating mode. The mapping is adjusted based on the current value of the load indicator, generating an adjusted mapping, and the system is operated in accordance with the adjusted mapping.

These and other advantages of the present disclosure will be apparent to those of ordinary skill in the art by reference to the following Detailed Description and the accompanying drawings.

BRIEF DESCRIPTION OF THE DRAWINGS

FIG. 5 shows an example of a predictive load map in accordance with an embodiment;

FIG. 7 shows the predictive load map of FIG. 5 after being adaptively adjusted in accordance with an embodiment.

DETAILED DESCRIPTION

Figure 1:
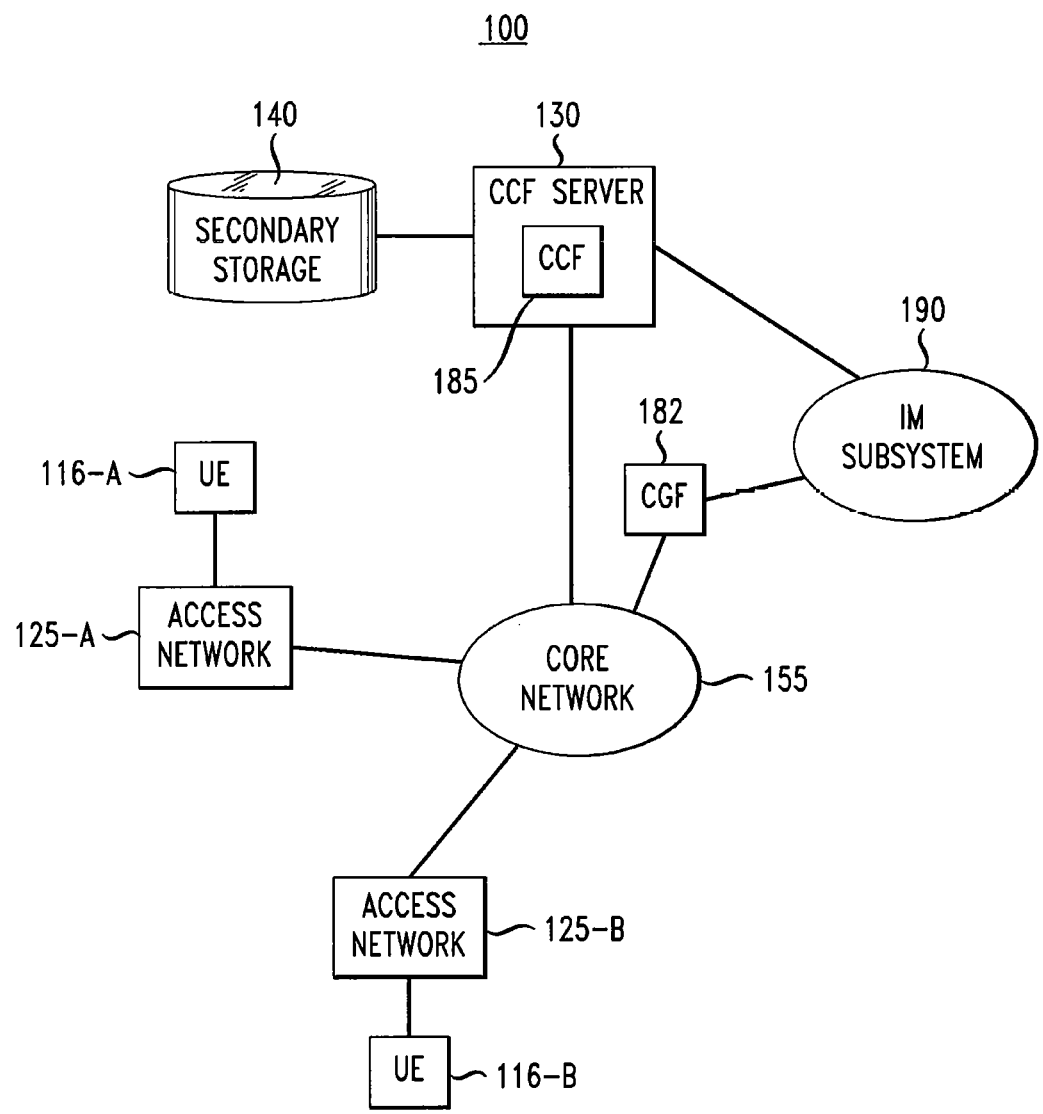
FIG. 1 shows a communication system in accordance with an embodiment.

A server in a telecommunications network, such as a charging collection function (CCF) server, may experience a need for resources—both a need for central processing unit (CPU) cycles and a need for available RAM—at an elevated level for a significant period of time each day. The transactional throughput for a CCF server is measured as the count of input account messages to the CCF plus the count of output accounting responses from the CCF on a per second basis. In a given day, week, or month, the throughput for a given CCF server may experience a pattern of one or more periods of relatively low traffic and one or more periods of relatively high traffic.

While server architectures have been developed to handle high levels of traffic, such as multi-core processors and blade-based architectures, multi-core and multi-CPU blade servers are associated with higher operating costs, because power consumption in such systems is significantly higher than that of single-core/single-CPU computing devices. In addition, heat dissipation and cooling needs can be challenging when such systems are deployed. For example, some existing systems include sixteen blade servers, each blade having two processors, and each processor having six cores. While such a 16×2×6 system provides high processing density, the power used by such a system is correspondingly high.

Deployments are often limited by constraints imposed by site engineering defining the amount of available power consumption, heat dissipation, and cooling needs. Accordingly, there is a need to provide a higher processing density system which does not consume power linearly as the CPU density increases.

With multi-core processors, power consumption typically increases as the core count increases. Therefore, a dual-core processor, with no other change, can consume twice the power of a single-core processor of the same family and characteristics. However, chip manufacturers typically lower the speed of the CPU in a multi-core chip architecture, such that each core individually operates at a lower speed than the single-core equivalent. However, by leveraging multiple cores, the architecture is able to provide a higher throughput in a consistent manner. This lowering of the speed, or operating frequency, is primarily driven by a need to keep the operating parameters in a deployment within engineered limits of power consumption, heat dissipation and cooling requirements.

Merely lowering the CPU core speed in itself is insufficient as a complete solution. This is borne out by the fact that when a deployment is sized in terms of computing units (count of blades, amount of primary and secondary memory, I/O link parameters, etc.), it is normal to take the heaviest load that a system can experience, add a safety buffer on top, and deduce the computing infrastructure necessary for the deployment. The heaviest load is computed for the busy hours experienced by the system, which may be normal working hours, and must also account for different time zones, if the same server is being used across different time zones. Within a single time zone, an eight to ten hour period is considered normal for computing the busy hour traffic to the system. Each additional time zone adds one hour.

As a result, solution or deployment engineering typically recommends a configuration which is suitable from the perspective of the largest load the system is expected to experience. However, the inefficiency of such a solution is particularly apparent during periods of low processing demands. During non-busy hours, many existing systems show a large contingent of servers showing a large percentage of CPU idle time. Many existing systems operate in a high performance mode even during periods of low traffic, drawing 100% of the rated power while performing little more than housekeeping activities. In these systems, the servers are severely underutilized for a considerable period of each day, at a high cost in terms of power.

It is apparent that the desire of processor manufacturers to limit power consumption by lowering the operating parameters, and the desire of deployment engineers to design a system to be able to handle the highest possible load with cycles to spare, represent two conflicting needs. The desire to have full power available at all times conflicts with the deployment objectives of lowering operating expenses, and tapping power only as needed.

In according with an embodiment, a solution is provided based on forcing processor states via monitoring key system resources at the CCF. Processor performance states (P-states) and processor operating states (C-states) allow a processor to switch between frequencies and voltage, and to turn off (or shut off one or more cores) to provide a desired level of performance and to optimize power consumption. P-state management allows a processor to switch between frequencies and voltage to provide a desired level of performance and consume a corresponding amount of power. C-state management allows an idle processor to turn off to conserve power. P-states and C-states are discussed in more detail below. P-states and C-states are known.

In the illustrative embodiment, systems and methods are described in the context of a charging collection function server within a telecommunication network. However, these examples are not to be construed as limiting. In other embodiments, systems and methods described herein may be used in other types of servers, and in other types of networks such as front-end web servers, back-end database servers, computational entities running large analytical tasks, etc.

FIG. 1 shows schematically a communication system 100 in accordance with an embodiment. Communication system 100 comprises first user equipment 116-A connected to a first access network 125-A and a second user equipment 116-B connected to a second access network 125-B. Each user equipment 116-A and 116-B may take any suitable form such as a landline telephone, a mobile telephone, a personal computer, etc. Each user equipment 116-A and 116-B communicate with access networks 125 via a landline connection, a wireless connection, or by another means. Each access network 125-A and 125-B may include one or more base stations (not shown), for example. Communication system 100 may include any number of user equipments and any number of access networks.

Each access network 125 communicates with a core network 155, which may be a packet switched network. Core network 155 may comprise one or more nodes (not shown), which are used to switch packet switched transactions. Access networks and core networks are known.

Communication system 100 also comprises an Internet Protocol multi-media (IM) subsystem 190, referred to herein as IMS 190. IMS 190 may comprise a number of elements (not shown), such as one or more proxy call session control function elements, one or more interrogating call session control function elements, and one or more serving call session control function elements. IMS 190 may also include one or more application servers which host various services. Internet Protocol multi-media subsystems are known.

Core network 155 and IMS 190 are connected to a charging gateway function (CGF) element 182. CGF 182 may be connected to a billing system. Use of a Charging Gateway Function is known.

Core network 155 and IMS 190 are also connected to a charging collection function (CCF) 185. The use of a charging collection function is known. In the embodiment of FIG. 1, CCF 185 is hosted by a CCF server 130.

CCF server 130 is connected to a secondary storage 140. Secondary storage 140 may be used by CCF server 130 to store various types of data.

Communication system 100 may include other components not shown in FIG. 1.

Figure 2:
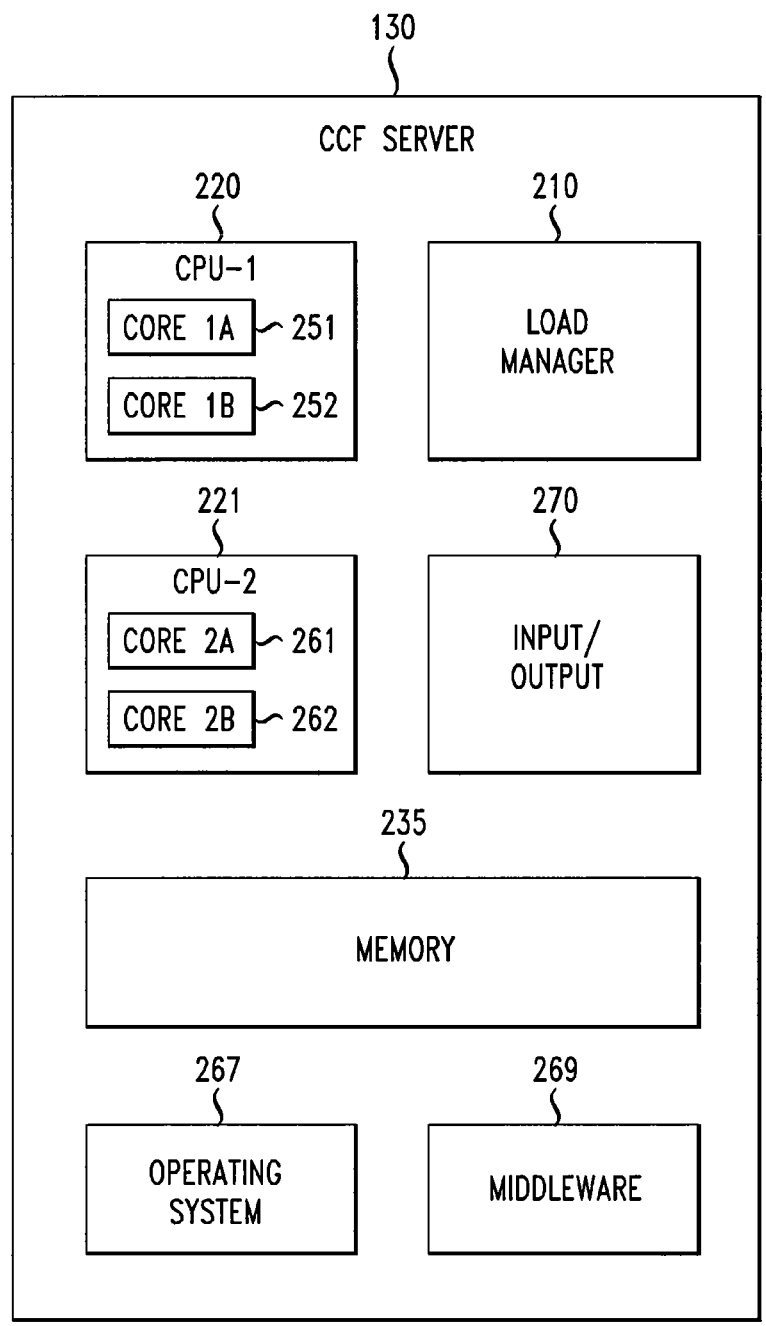
FIG. 2 shows components of a CCF server in accordance with an embodiment.

FIG. 2 shows functional components of CCF server 130 in accordance with an embodiment. CCF server 130 comprises a plurality of central processing units (CPUs), including CPU-1 (220) and CPU-2 (221). In other embodiments, CCF server 130 may comprise more or fewer than two central processing units. CCF server 130 also comprises a memory 235 and one or more input/output devices 270. CCF server 130 may comprise other components not shown in FIG. 2.

CPU-1 (220) comprises multiple cores. In the illustrative embodiment of FIG. 2, CPU-1 (220) comprises a core 1A (251) and a core 1B (252).

CPU-2 (221) comprises multiple cores. In the illustrative embodiment of FIG. 2, CPU-2 (221) comprises a core 2A (261) and a core 2B (262).

Memory 235 is used from time to time by other components of CCF server 130 to store control data, and other information. Memory 235 may comprise random access memory (RAM), read only memory (ROM), one or more disk drives, flash memory, and/or other types of memory devices.

Input/output devices 270 comprise one or more interfaces by which CCF server 130 communicates with other components of communication system 100.

CCF server 130 comprises an operating system 267 and a middleware 269. In the illustrative embodiment, operating system 267 comprises one or more computer programs that manage computer hardware resources and provide a framework for software application entities to run on and utilize architectural components. Operating system 267 provides a first abstraction layer to facilitate the development and operation of applications. Middleware 269 provides another abstraction on top of the operating system layer to facilitate the development and operation of applications, and provides a sandbox environment to enable applications to execute within a safe zone of execution. Middleware 269 further abstracts the hardware of the system, when compared to the operating system, but operates within the limits imposed by the operating system.

CCF server 130 also comprises a load manager 210. Load manager 210 monitors loads handled by various components of CCF server 130, and from time to time selects an operating mode appropriate to a current load.

In one embodiment, load manager 210 is an application entity. Load manager 210 is separate from and not part of underlying operating system 267, or of middleware 269.

CCF server 130 may operate using a plurality of operating modes associated with various operating states. Processor performance states (P-states) are associated with the capability of a processor to switch between different supported operating frequencies and voltages to modulate power consumption. The use of various CPU P-states power management states is known. Use of different P-states provides a way to scale the frequency and voltage at which a CPU runs in order to reduce the power consumption of the CPU. The number of P-states is processor specific. If configured properly according to system workload, this feature provides power savings. In accordance with convention, higher P-state numbers represent slower processor speeds. Power consumption is lower at higher P-states. For example, a P3 state is higher than a P1 state. A processor in a P3 state will run more slowly and use less power than a processor running in a P1 state. To operate at any P-state, the processor must be in an operational state where the processor is working and not idling.

In one embodiment, CCF server 130 may be configured to operate in accordance with any one of a number of possible P-states. P-states are numerically named from P0 to PN, with P0 representing the state that corresponds to the maximum performance level. The P-states define a range of performance levels and may be defined to match the expected performance demand, or the required workload of the system at any moment. For example, a plurality of P-states may be defined as follows:

At P0, the system operates at 100% CPU speed and applies 100% voltage to the system.

At P1, the system operates at 90% CPU speed and applies 95% voltage to the system.

At P2, the system operates at 70% CPU speed and applies 90% voltage to the system.

At P3, the system operates at 50% CPU speed and applies 80% voltage to the system.

Typically, P-states are pre-defined for each processor in a system. The example above is exemplary and is not to be construed as limiting, or as applicable to any particular processor.

With respect to the various P-states defined above, reduced voltage levels are associated with power saving for the processor. Thus, at P-states other than P0, the system consumes comparatively less power.

Various CPU C-states power management states may be defined for a given system. CPU operating states (C-states) reflect the capability of an idle processor to turn off unused components to save power. When a processor runs in the C0 state it is working. A processor running in any other C-state is idle. In accordance with convention, higher C-state numbers represent deeper CPU sleep states. At higher C-states, more components shut down to save power. Some components that are shut down include stopping the processor clock and stopping interrupts. A processor, or a core within a processor, may also be shut down in a selected C-state. A disadvantage of using higher C-states is that deeper sleep states have slower wake up times. Use of various C-states is known.

C-states are typically numbered C0 to CN, with C0 being an active state with no associated response latency. As the C-state number increases, the performance of the processor decreases, as does power consumption. For example, a processor may be associated with the following C-states:

C0: response latency of zero.
C1: response latency of 100 units of time.
C2: response latency of 1000 units of time.
C3: response latency of 10,000 units of time.

An operating mode refers to combination of a selected P-state and a selected C-state. Typically, under heavy loads, an operating mode is selected in which a processor operates in a P0/C0 state. As processing requirements decrease, other operating modes may be used in which lower CPU operating speeds and lower voltage are employed, and/or higher response latency is tolerated. For example, a system may be operated in accordance with an operating mode associated with a P1/C1 state, a P1/C2 state, a P2/C1 state, etc. Other combinations are possible.

In accordance with an embodiment, a plurality of operating modes are defined. Each operating mode is associated with a particular P-state and a particular C-state. For example, referring to the examples discussed above, a first operating mode may be associated with the P0 and C0 states; this operating mode may be desirable during periods of high traffic. In contrast, a second operating mode may be associated with the P3 and C3 states. Such a state may be suitable for periods of low traffic. In addition, various other operating modes associated with other combinations of P-states and C-states may be defined. For example, a first operating mode associated with the P2 and C1 states, a second operating mode associated with the P2 and C2 states, and a third operating mode associated with the P2 and C3 states, may be defined. Operating modes may be selected and defined based on the particular system used and on expected traffic patterns and corresponding processing or computational needs of the system.

A P-state alteration changes the CPU speed and voltage of a CPU between allowed sets of values, resulting in power savings during the time the CPU is not fully utilized. A C-state alteration can shut down a CPU core, such that the CPU core is not available for processing. Such a C-state may be desirable during a period of low traffic. Use of such a C-state may save power; however, the core is not available for processing requests.

Load Indicator

In one embodiment, a current value of a load indicator of a system is determined, and an operating mode (defined by a selected P-state and a selected C-state) is determined based on the current value of the load indicator. In the illustrative embodiment, a plurality of operating modes associated with selected P-states and C-states are defined. For example, a "high performance" mode associated with P0 and C0 states, a "medium high performance" mode associated with P1 and C1 states, a "medium performance" mode associated with P2 and C2 states, and a "low performance" mode associated with P3 and C3 states, may be defined. For example, in the medium performance mode, the system may lower the operating frequency of all cores in one or more CPUs to a selected value, and in the low performance mode, the system may shut down a core. The operating modes described above are exemplary only; in other embodiments, other operating modes associated with other combinations of P-states and C-states may be defined.

In an illustrative embodiment, CCF server 130 is operated in accordance with the performance modes described above. Accordingly, in "high" performance mode, all cores 251, 252, 261, and 262 are utilized, the system operates at 100% CPU speed, and 100% voltage is applied to the system. In other operating modes, the CPU speed and voltage may be reduced, and one or more of cores 251, 252, 261, and 262 may be shut down.

Further, several thresholds T0, T1, T2 may be defined as follows:

If a load indicator of the system exceeds threshold T0, the system operates in the "high performance" mode.

If a load indicator is between threshold T0 and threshold T1, the system operates in the "medium-high" mode.

If the load indicator is between threshold T1 and threshold T2, the system operates in the "medium" performance mode.

If the load indicator is below threshold T2, the system operates in the "low" performance mode.

In one embodiment, each of the thresholds T0, T1, and T2 is associated with a respective composite load indicator value L0, L1, and L2.

Each of the threshold load indicator values represents a different composite value. For example, L0 may be keyed off the CPU utilization percentage, which may provide a good reflection of the system status for a transactional entity such as CCF server 130. In another embodiment, L0 may be a derivative of several measures. For example, in one embodiment, L0 is reached when the load indicator falls below one of:

(1) 20% CPU utilization;
(2) 25% CPU utilization and 10% memory utilization;
(3) 25% CPU utilization and 10% I/O utilization;
(4) 30% CPU utilization and 5% memory utilization; or
(5) 5% I/O utilization.

The indicators described above are exemplary and are not to be construed as limiting. Other indicators may be used. For example, indicators relating to any lists, queues and buffers which are critical indicators of a system performance level may be used.

The load indicator values associated with various thresholds may be statistically defined based on system benchmarking prior to field deployment. Each load indicator value corresponds to one and only one threshold. This too is statistically determined based on CPU design. It is possible for more P-states and C-states to be available for a given CPU, and a deployment may choose to use fewer thresholds. However, the number of thresholds may not exceed the sum of the possible combinations of P-states and C-states.

The thresholds defined above are exemplary only. In other embodiments, any number of thresholds, and any number of associated operating modes, may be defined. The definition of thresholds and operating states may depend on the design of the CPU(s), and specifically, the P-states and C-states permitted for the operation of the CPU core. In addition, the CPU manufacturer may have established pre-defined policies that can be used to define thresholds and operating modes. For example, a safe policy may vary the P-state alone without changing the C-state, while an aggressive policy may allow varying both the P-states and the C-states.

In defining thresholds, the following issues may be considered. A P-state alteration changes the CPU speed and the voltage of a CPU between allowed sets of values, resulting in power saving during the time the CPU is not fully utilized. A C-state alteration can shut down a CPU core, so that it is not available for processing during periods of low traffic. This can save more power than simply altering the P-state; however, the core is not then available for processing requests. When a server experiences an increase in traffic requiring a change to another operating mode, it may be desirable to gradually upgrade the performance level of the server to handle processing requests. This should be done keeping in mind the P-state transition latency.

Figure 3:
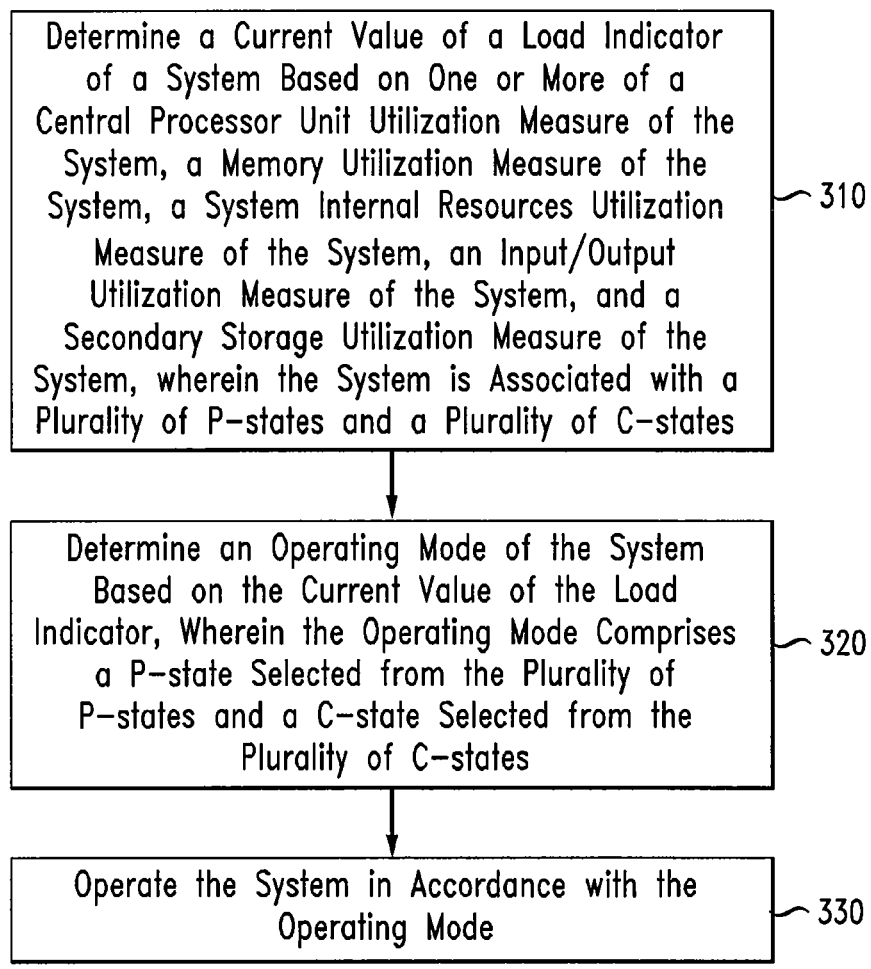
FIG. 3 is a flowchart of a method of operating a system in accordance with an embodiment.

In accordance with an embodiment, the current value of the load indicator of a system is monitored and used to determine a suitable operating mode for the system. FIG. 3 is a flowchart of a method of operating a system in accordance with an embodiment. In an illustrative embodiment, the method outlined in FIG. 3 is used to select an appropriate operating mode for CCF server 130. In this illustrative embodiment, a suitable operating mode is selected for CCF server 130 in accordance with the thresholds discussed above.

At step 310, a current value of a load indicator of a system is determined based on a composite of one or more of a central processor unit utilization measure of the system, a memory utilization measure of the system, a system internal resources utilization measure, an input/output utilization measure of the system, and a secondary storage utilization measure of the system, wherein the system is associated with a plurality of P-states and a plurality of C-states. Other measures may be included in the load indicator. In the illustrative embodiment of FIGS. 1 and 2, load manager 210 monitors a central processor unit utilization measure of CCF server 130, a memory utilization measure of CCF server 130, an input/output utilization measure of CCF server 130, and a system internal resources utilization measure of CCF server 130, which is a measure of the utilization of selected resources internal to the system, such as critical buffers, messaging queues, etc. Load manager 210 also monitors a secondary storage utilization measure indicating a measure of the utilization by CCF server 130 of secondary storage 140. Load manager 210 determines a value of a load indicator based on a composite of these measures in accordance with a predetermined formula or weighting.

In one embodiment, the formula according to which the load-state of a system is determined is based on parameters such as CPU utilization, memory utilization, fill-factor of system queues, lists and buffers, IO link utilization, and secondary storage utilization, in accordance with the engineered system limits for the computational entity.

Monitoring of load indicators by load manager 210, which is an application entity (and not integral to the underlying operating system or the middleware of the system), advantageously allows flexibility in controlling a system's operations. Because load manager 210 is an application entity, load manager 210 may be more easily configured and programmed to meet the particular needs of a given system environment.

In other embodiments, a load indicator may be determined based on more or fewer than four performance measures. In other embodiments, other performance measures different from those discussed herein may be considered in determining a value of a load indicator.

At step 320, an operating mode of the system is determined based on the current value of the load indicator, wherein the operating mode comprises a P-state selected from the plurality of P-states and a C-state selected from the plurality of C-states. In accordance with the thresholds discussed above, load manager 210 selects an appropriate operating mode from among the high performance, medium-high performance, medium performance, and low performance operating modes, based on the current value of the load indicator. For example, if the current value of the load indicator exceeds threshold T0, load manager 210 selects the "high performance" operating mode.

At step 330, the system is operated in accordance with the operating mode. Load manager 210 causes CCF server 130 to operate in accordance with the operating mode selected at step 320. Following the illustrative example, load manager 210 may cause CCF server 130 to operate in accordance with the high performance mode, while the current value of the load indicator exceeds threshold T0.

In another embodiment, traffic patterns experienced by a system are observed, and a predictive load map is generated to facilitate operation in a power-saving mode during selected time periods. A predictive load map may reflect historical measurements of the load indicator at different times and therefore show patterns indicating correlations between various times or time periods and different values of the load indicator. The load map reflects a historical perspective accumulated by observing the operation of the system over time, with possible initial input on peak and lean times provided by an operator. For example, a load map may contain data indicating that the hours of 2:00 AM to 6:00 AM typically are associated with the lowest traffic (and consequently the lowest load), while the hours of 8:00 AM to 11:00 AM typically experience the highest traffic (and consequently the highest load).

Figure 4A:
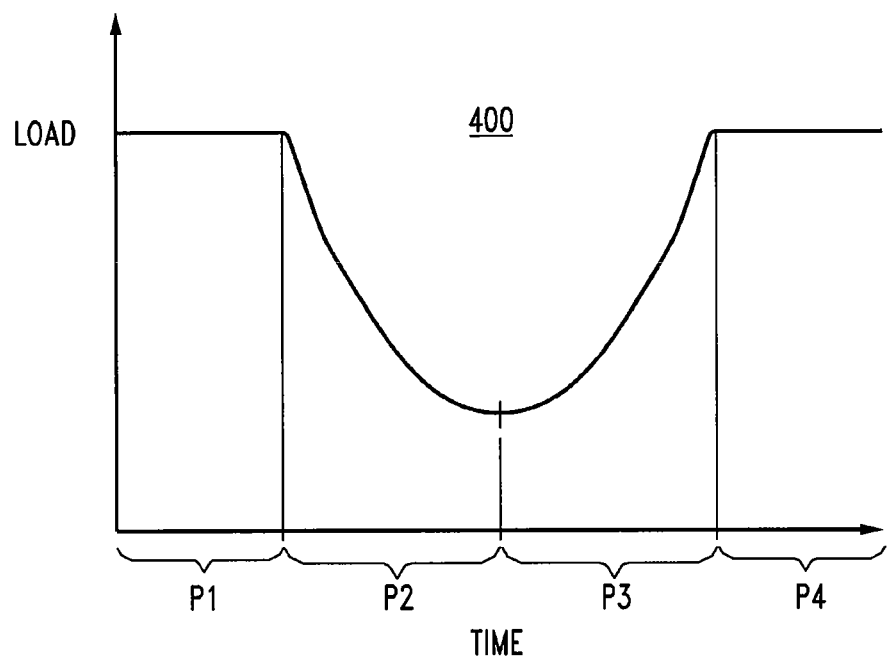
FIG. 4A shows an example of a load map in accordance with an embodiment.

FIG. 4A shows an example of a load map of CCF server 130 in accordance with an embodiment. Load map 400 indicates measurements of a load indicator associated with CCF server 130 obtained over a period of time including periods P1, P2, P3, and P4. In the illustrative embodiment, load map 400 may shows values of the load indicator over the course of one day. In other embodiments, a load map may show values of the load indicator over the course of one week, one month, one year, etc.

Referring to FIG. 4A, during time period P1, the load indicator has a relatively high value, indicating a high level of traffic. During period P2, the value of the load indicator falls, indicating a decreasing level of traffic. During period P3, the value of the load indicator rises. During period P4, the value of the load indicator is again relatively high. Load map 400 indicates that certain periods associated with low traffic may offer opportunities to save power by utilizing a higher P-state or C-state. For example, while low P-states and C-states may be needed during periods P1 and P4, during all or portions of periods P2 and P3, lower P-states and C-states (requiring less power) may be sufficient to handle the lower levels of traffic.

Figure 4B:
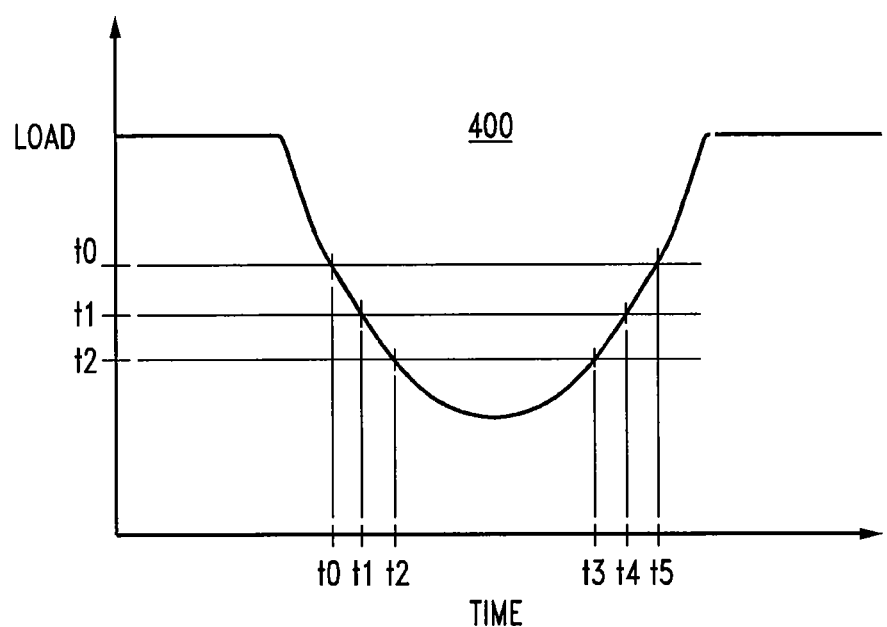
FIG. 4B shows the load map of FIG. 4A and several thresholds in accordance with an embodiment.

FIG. 4B shows a load map 400 and several thresholds. As indicated in FIG. 4B, until time t0, the value of the load indicator exceeds threshold T0. From time t0 to time t1, the value of the load indicator is between threshold T0 and T1. Between times t1 and t2, the value of the load indicator is between threshold T1 and threshold T2. Between times t2 and time t3, the value of the load indicator is below threshold T2. From time t3 to time t4, the value of the load indicator is between threshold T1 and T2. Between times t4 and t5, the value of the load indicator is between threshold T1 and threshold T0. After time t5, the value of the load indicator exceeds threshold T0.

In one embodiment, hysteresis values (not shown) associated with each threshold transition are used to avoid a fluttering, which is a phenomenon that forces a system to switch rapidly from one state to another and back to the first as the input load to the system varies around a narrow window about the threshold.

The analysis shown in FIG. 4B may be used to generate a predictive load map, which may be employed to operate CCF server 130. FIG. 5 shows a predictive load map that may be used to operate CCF server 130 in accordance with an embodiment. Predictive load map 500 comprises a first column 511 that indicates various time periods during a day, and a second column 514 that indicates an operating mode to be selected during each respective time period. For example, record 531 indicates that during the time period before time t0, the "high" performance operating mode is to be used. Record 532 indicates that between times t0 and t1, the "medium high" performance operating mode is to be used. Record 533 indicates that between times t1 and t2, the "medium" performance operating mode is to be used. Record 534 indicates that between times t2 and t3, the "low" performance operating mode is to be used. Record 535 indicates that between times t3 and t4, the "medium" performance operating mode is to be used. Record 536 indicates that between times t4 and t5, the "medium high" performance operating mode is to be used. Record 537 indicates that after time t5, the "high" performance operating mode is to be used.

In accordance with an embodiment, CCF server 130 is operated in accordance with predictive load map 500. Thus, during each day of operation, during the time period before time t0, CCF server 130 is operated in accordance with the "high" performance operating mode. Between times t0 and t1, CCF server 130 is operated in accordance with the "medium high" performance operating mode. Between times t1 and t2, CCF server 130 is operated in accordance with the "medium" performance operating mode. Between times t2 and t3, CCF server 130 is operated in accordance with the "low" performance operating mode. Between times t3 and t4, CCF server 130 is operated in accordance with the "medium" performance operating mode. Between times t4 and t5, CCF server 130 is operated in accordance with the "medium high" performance operating mode. After time t5, CCF server 130 is operated in accordance with the "high" performance operating mode.

Adaptive Adjustment of Predictive Load Map

In accordance with an embodiment, a method for adaptively adjusting a load map is provided. Accordingly, a predictive load map is generated for a system, such as CCF server 130, in the manner described above. The system is operated in accordance with the predictive load map. However, because traffic patterns may change, and the system may experience levels of traffic not anticipated by the predictive load map, actual values of the load indicator of the system are obtained and monitored over time. The load map is adaptively adjusted based on the actual values of the load indicator. The system is then operated in accordance with the adjusted load map.

Figure 6:
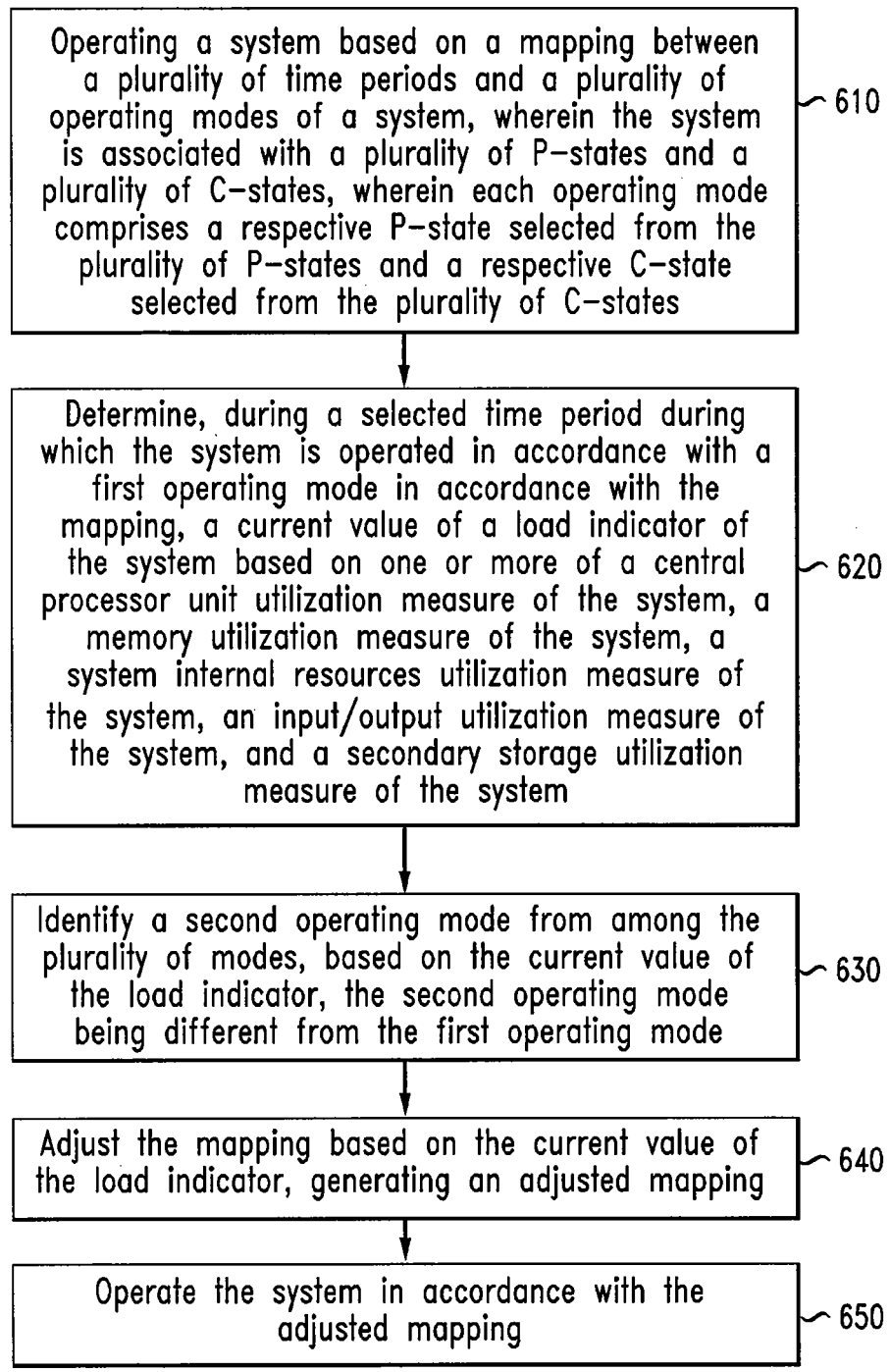
FIG. 6 is a flowchart of a method of adaptively adjusting a predictive load map in accordance with an embodiment.

FIG. 6 is a flowchart of a method of adaptively adjusting a load map in accordance with an embodiment. At step 610, a system is operated based on a mapping between a plurality of time periods and a plurality of operating modes of a system, wherein the system is associated with a plurality of P-states and a plurality of C-states, wherein each operating mode comprises a respective P-state selected from the plurality of P-states and a respective C-state selected from the plurality of C-states. In an illustrative embodiment, CCF server 130 is operated in accordance with predictive load map 500, in the manner described above.

At step 620, during a selected time period during which the system is operated in accordance with a first operating mode in accordance with the mapping, a current value of a load indicator of the system is determined based on one or more of a central processor unit utilization measure of the system, a memory utilization measure of the system, a system internal resources utilization measure, an input/output utilization measure of the system, and a secondary storage utilization measure of the system. Load manager 210 obtains the value of various performance measures continuously or at selected times while CCF server 130 operates. Load manager 210 further computes the value of the load indicator, based on the current values of the various performance measures, continuously or at selected times.

At step 630, a second operating mode is identified from among the plurality of operating modes, based on the current value of the load indicator, the second operating mode being different from the first operating mode. Suppose that CCF server 130 is regularly operated in accordance with the "medium performance" operating mode between the times t1 and t2, in accordance with predictive load map 500. Suppose now that on a particular day load manager 210 determines that the value of the load indicator is above T0 between times t1 and t2 (indicating heavy traffic during this period). Suppose further that load manager 210 observes that the value of the load indicator is above T0 between times t1 and t2 for five consecutive days. Load manager 210 may determine that the expected value of the load indicator between times t1 and t2 is now above T0. Load manager 210 also may determine that the "high performance" operating mode is more suitable to this time period, in order to handle the expected heavy traffic.

At step 640, the mapping is adjusted based on the current value of the load indicator, generating an adjusted mapping. In the illustrative embodiment, load manager 210 adjusts predictive load map 500 to implement the "high performance" operating mode between the times t1 and t2. An adjusted predictive load map is shown in FIG. 7. Referring to record 733 of adjusted predictive load map 700, the time period between t1 and t2 is now associated with the "high performance" operating mode.

At step 650, the system is operated in accordance with the adjusted mapping. CCF server 130 is subsequently operated in accordance with adjusted predictive load map 700. Thus, each day between times t1 and t2, CCF server 130 is operated in accordance with the "high performance" operating mode.

In accordance with an embodiment, when load manager 210 determines that CCF server 130 must switch from a first operating mode to a second operating mode, load manager 210 exercises available calls to do so. For example, in a Linux-based OS environment, the Linux CPUFreq subsystem allows dynamic frequency scaling. In one embodiment, five governors are available to manage the CPUFreq:

For maximum performance, using governor "performance" sets the CPU to run at the highest frequency ("scaling_max_freq").

For maximum efficiency, using governor "powersave" sets the CPU to run at the lowest frequency ("scaling_min_freq").

Choosing governor "ondemand" adapts to the current load. In this operating mode, the load is regularly checked, and when it exceeds "up_threshold," the CPU is set to run at the highest frequency (scaling_max_freq). When the load recedes, the CPU is run at the next lower level. The frequency of checking is controlled by a Kernel parameter called "sampling_rate," which defines, in microseconds, how frequently the CPU load samples are to be measured. This option also allows an operator to ignore the load produced by certain tasks.

Choosing governor "conservative" is similar to "ondemand," as the CPU has a close adaptation to the load; however, this mode incurs a higher latency than the "ondemand" mode.

Choosing governor "userspace" allows a control by a user-defined program, and the CPU frequency is set by the "scaling_setspeed" parameter, controlled by the user-defined program. This provides the most freedom, as the user space program can react to any number of conditions or events.

Among the governors described above, choosing the "ondemand" governor provides a simple solution. Choosing the "userspace" governor provides more granular control.

In various embodiments, the method steps described herein, including the method steps described in FIG. 3 and/or FIG. 6, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 3 and/or FIG. 6. Certain steps of the methods described herein, including one or more of the steps of FIG. 3 and/or FIG. 6, may be performed by a server or by another processor in a network-based cloud-computing system. Certain steps of the methods described herein, including one or more of the steps of FIG. 3 and/or FIG. 6, may be performed by a client computer in a network-based cloud computing system. The steps of the methods described herein, including one or more of the steps of FIG. 3 and/or FIG. 6, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 3 and/or FIG. 6, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 8:
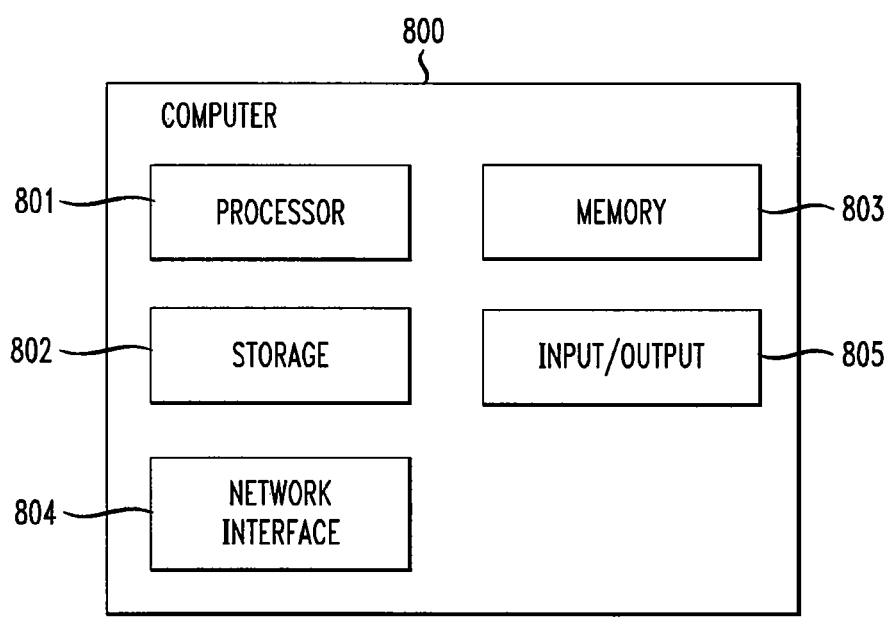
FIG. 8 shows components of a computer that may be used to implement the invention.

A high-level block diagram of an exemplary computer that may be used to implement systems, apparatus and methods described herein is illustrated in FIG. 8. Computer 800 includes a processor 801 operatively coupled to a data storage device 802 and a memory 803. Processor 801 controls the overall operation of computer 800 by executing computer program instructions that define such operations. The computer program instructions may be stored in data storage device 802, or other computer readable medium, and loaded into memory 803 when execution of the computer program instructions is desired. Thus, the method steps of FIG. 3 and/or FIG. 6 can be defined by the computer program instructions stored in memory 803 and/or data storage device 802 and controlled by the processor 801 executing the computer program instructions. For example, the computer program instructions can be implemented as computer executable code programmed by one skilled in the art to perform an algorithm defined by the method steps of FIG. 3 and/or FIG. 6. Accordingly, by executing the computer program instructions, the processor 801 executes an algorithm defined by the method steps of FIG. 3 and/or FIG. 6. Computer 800 also includes one or more network interfaces 804 for communicating with other devices via a network. Computer 800 also includes one or more input/output devices 805 that enable user interaction with computer 800 (e.g., display, keyboard, mouse, speakers, buttons, etc.).

Processor 801 may include both general and special purpose microprocessors, and may be the sole processor or one of multiple processors of computer 800. Processor 801 may include one or more central processing units (CPUs), for example. Processor 801, data storage device 802, and/or memory 803 may include, be supplemented by, or incorporated in, one or more application-specific integrated circuits (ASICs) and/or one or more field programmable gate lists (FPGAs).

Data storage device 802 and memory 803 each include a tangible non-transitory computer readable storage medium. Data storage device 802, and memory 803, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 805 may include peripherals, such as a printer, scanner, display screen, etc. For example, input/output devices 805 may include a display device such as a cathode ray tube (CRT) or liquid crystal display (LCD) monitor for displaying information to the user, a keyboard, and a pointing device such as a mouse or a trackball by which the user can provide input to computer 800.

Any or all of the systems and apparatus discussed herein, including CCF server 130, load manager 210, CPU-1 (220), CPU-2 (221), input/output 270, and memory 235, may be implemented using a computer such as computer 800.

One skilled in the art will recognize that an implementation of an actual computer or computer system may have other structures and may contain other components as well, and that FIG. 8 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of operating a data processing system, wherein the data processing system is associated with a plurality of P-states and a plurality of C-states, comprising:
   determining a current value of a load indicator of the system based on a plurality of measures, each measure weighted based on its respective system limit for the data processing system, the plurality of measures including a central processor unit utilization measure of the system, a memory utilization measure of the system, a system-internal resources utilization measure, an input/output utilization measure of the system, and a secondary storage utilization measure of the system;
   determining an operating mode of the system based on the current value of the load indicator, wherein the operating mode comprises a P-state selected from the plurality of P-states and a C-state selected from the plurality of C-states; and
   operating the system in accordance with the operating mode.

2. The method of claim 1, wherein the system comprises a charging collection function server.

3. The method of claim 2, further comprising:
   generating a first mapping that associates each of a plurality of values of the load indicator with a respective desired operating mode.

4. The method of claim 3, wherein determining the operating mode of the system based on the current value of the load indicator further comprises:
   identifying a desired operating mode associated with the current value of the load indicator based on a first mapping.

5. The method of claim 3, wherein generating the first mapping further comprises:
   associating a first value of the load indicator to a first operating mode comprising a first P-state; and
   associating a second value of the load indicator to a second operating mode comprising a second P-state, the second P-state being different from the first P-state.

6. The method of claim 5, wherein:
   the first operating mode further comprises a selected C-state; and
   the second operating mode further comprises the selected C-state.

7. The method of claim 5, wherein:
   the first operating mode further comprises a first C-state; and
   the second operating mode further comprises a second C-state different from the first C-state.

8. The method of claim 5, further comprising:
   defining a first range of values of the load indicator and a second range of values of the load indicator, the first range of values comprising the first value, the second range of values comprising the second value;
   associating the first operating mode with the first range of values; and
   associating the second operating mode with the second range of values.

9. The method of claim 8, further comprising:
   generating a second mapping that associates the first range of values of the load indicator with a first period of time, and associates the second range of values of the load indicator with a second period of time;
   determining an expected load value based on the second mapping;
   identifying a first operating mode associated with the expected load value, based on the first mapping; and
   operating the system in accordance with the first operating mode.

10. The method of claim 9, further comprising:
    determining that the current value of the load indicator is different from the expected load value;
    selecting a second operating mode associated with the current value of the load indicator; and
    operating the system in accordance with the second operating mode.

11. The method of claim 10, wherein the data processing system comprises an operating system and system middleware, the method further comprising:
    determining, by an application entity different from the operating system and system middleware, a current value of a load indicator of the system based on a central processor unit utilization measure of the system, a memory utilization measure of the system, a system-internal resources utilization measure, an input/output utilization measure of the system, and a secondary storage utilization measure of the system; and
    determining, by the application entity, an operating mode of the system based on the current value of the load indicator, wherein the operating mode comprises a P-state selected from the plurality of P-states and a C-state selected from the plurality of C-states.

12. A non-transitory computer readable medium having program instructions stored thereon, the instructions capable of execution by a processor and defining the steps of:
    determining a current value of a load indicator of a system based on a plurality of measures, each measure weighted based on its respective system limit for the data processing system, the plurality of measures including a central processor unit utilization measure of the system, a memory utilization measure of the system, a system-internal resources utilization measure, an input/output utilization measure of the system, and a secondary storage utilization measure of the system, wherein the system is associated with a plurality of P-states and a plurality of C-states;
    determining an operating mode of the system based on the current value of the load indicator, wherein the operating mode comprises a P-state selected from the plurality of P-states and a C-state selected from the plurality of C-states; and
    operating the system in accordance with the operating mode.

13. The non-transitory computer readable medium of claim 12, wherein the system comprises a charging collection function server.

14. The non-transitory computer readable medium of claim 13, further comprising program instructions defining the step of:

generating a first mapping that associates each of a plurality of values of the load indicator with a respective desired operating mode.

15. The non-transitory computer readable medium of claim 14, further comprising program instructions defining the step of:

identifying a desired operating mode associated with the current value of the load indicator based on the first mapping.

16. A method of operating a data processing system, wherein the data processing system is associated with a plurality of operating modes, each operating mode comprising a respective P-state selected from a plurality of P-states and a respective C-state selected from a plurality of C-states, comprising:

operating the system based on a mapping between a plurality of time periods and the plurality of operating modes;

determining, during a selected time period during which the system is operated in accordance with a first operating mode in accordance with the mapping, a current value of a load indicator of the system based on one or more performance measures;

identifying a second operating mode from among the plurality of operating modes based on the current value of the load indicator, the second operating mode being different from the first operating mode;

adjusting the mapping based on the current value of the load indicator, thereby generating an adjusted mapping; and operating the system in accordance with the adjusted mapping.

17. The method of claim 16, wherein the data processing system comprises a charging collection function server.

18. The method of claim 16, further comprising:

operating the system during the selected time period in accordance with the second operating mode.

19. The method of claim 16, further comprising:

determining, for each of the plurality of time periods, a corresponding load indicator value;

generating the mapping by selecting, for each of the plurality of time periods, a corresponding operating mode from among the plurality of operating modes, based on the corresponding load indicator value.

20. The method of claim 16, wherein the data processing system comprises an operating system and system middleware, the method further comprising:

determining, by an application entity different from the operating system and system middleware, during a selected time period during which the system is operated in accordance with a first operating mode in accordance with the mapping, a current value of a load indicator of the system based on one or more performance measures;

identifying, by the application entity, a second operating mode from among the plurality of operating modes based on the current value of the load indicator, the second operating mode being different from the first operating mode; and adjusting, by the application entity, the mapping based on the current value of the load indicator, thereby generating an adjusted mapping.

\* \* \* \* \*